United States Patent
Steele

(10) Patent No.: US 10,307,690 B2
(45) Date of Patent: Jun. 4, 2019

(54) METHOD FOR EXTRACTING ESSENTIAL OILS

(71) Applicant: ESSENTIAL INNOVATIONS, INC., Edmonds, WA (US)

(72) Inventor: Casey Steele, Edmonds, WA (US)

(73) Assignee: ESSENTIAL INNOVATIONS, INC., Edmonds, WA (US)

( * ) Notice: Subject to any disclaimer, the term of this patent is extended or adjusted under 35 U.S.C. 154(b) by 0 days.

(21) Appl. No.: 15/788,185

(22) Filed: Oct. 19, 2017

(65) Prior Publication Data
US 2018/0036650 A1 Feb. 8, 2018

Related U.S. Application Data

(60) Division of application No. 15/610,391, filed on May 31, 2017, which is a continuation of application No. PCT/US2016/045422, filed on Aug. 3, 2016.

(60) Provisional application No. 62/309,800, filed on Mar. 17, 2016, provisional application No. 62/201,320, filed on Aug. 5, 2015.

(51) Int. Cl.
| | |
|---|---|
| *B01D 11/02* | (2006.01) |
| *A61L 2/00* | (2006.01) |
| *B08B 3/00* | (2006.01) |
| *B01D 3/00* | (2006.01) |

(Continued)

(52) U.S. Cl.
CPC ...... *B01D 11/0219* (2013.01); *B01D 11/0207* (2013.01); *B01D 11/0288* (2013.01); *B01D 11/0292* (2013.01); *C11B 1/10* (2013.01); *C11B 9/02* (2013.01)

(58) Field of Classification Search
CPC .. B03B 5/00; A61L 9/01; B01D 17/00; C11B 9/00; C11B 1/04; C11B 1/10; C11B 3/12
USPC ....... 422/253, 261, 276, 284-285, 292, 300, 422/307, 311, 264, 273; 137/544; 196/104, 119, 14.52; 202/82; 134/47,
(Continued)

(56) References Cited

U.S. PATENT DOCUMENTS 2,199,670 A * 5/1940 Lowry ............... B01D 11/0226
159/DIG. 29
4,808,426 A 2/1989 Strop et al.
(Continued)

FOREIGN PATENT DOCUMENTS

| CN | 103254049 A | 8/2013 |
| WO | 2017024072 A1 | 2/2017 |

OTHER PUBLICATIONS

International Search Report and Written Opinion, dated Nov. 2, 2016, for corresponding International Application No. PCT/US2016/045422, 9 pages.

(Continued)

*Primary Examiner* — Monzer R Chorbaji
(74) *Attorney, Agent, or Firm* — Seed IP Law Group LLP

(57) ABSTRACT

A system and method of extracting essential oils from plant material through the use of a low pressure alcohol-based closed system that includes a solvent chamber connected to a material column that in turn is connected to a recovery chamber. Plant material in the material column and the solvent in the solvent chamber are cooled using a cooling liquid, such as nitrogen. A vacuum pump connected to the recovery chamber creates a vacuum in the recovery chamber to draw the cooled solvent through the cooled plant material and extract essential oils, which are collected in the recovery chamber.

20 Claims, 7 Drawing Sheets

(51) Int. Cl.
*C11B 1/10* (2006.01)
*C11B 9/02* (2006.01)

(58) Field of Classification Search
USPC ..... 134/84, 105; 206/219, 499, 503, 495.01; 220/500
See application file for complete search history.

(56) References Cited

U.S. PATENT DOCUMENTS

| | | |
|---|---|---|
| 6,111,119 A | 8/2000 | Trout |
| 7,001,880 B1 | 2/2006 | Yomogida et al. |
| 2002/0074292 A1 | 6/2002 | Schlegel et al. |
| 2002/0127316 A1 | 9/2002 | Trout |
| 2010/0089132 A1* | 4/2010 | Larter ............... G01N 1/34 73/54.01 |
| 2011/0133120 A1* | 6/2011 | McGhee ............ B01D 11/0219 252/182.12 |
| 2012/0251642 A1 | 10/2012 | Gu et al. |
| 2014/0193303 A1 | 7/2014 | Ellis et al. |
| 2016/0045422 A1 | 2/2016 | Huang et al. |

OTHER PUBLICATIONS

International Search Report and Written Opinion dated Jul. 2, 2018 for International Application No. PCT/US18/35462, 8 pages.
U.S. Appl. No. 15/610,346, filed May 31, 2017, Essential Oil Extraction, Recovery, and Purge System.
U.S. Appl. No. 15/610,391, filed May 31, 2017, System and Method for Extracting Essential Oils.
U.S. Appl. No. 16/004,868, filed Jun. 11, 2018, Essential Oil Extraction, Recovery, and Purge System and Method.

* cited by examiner

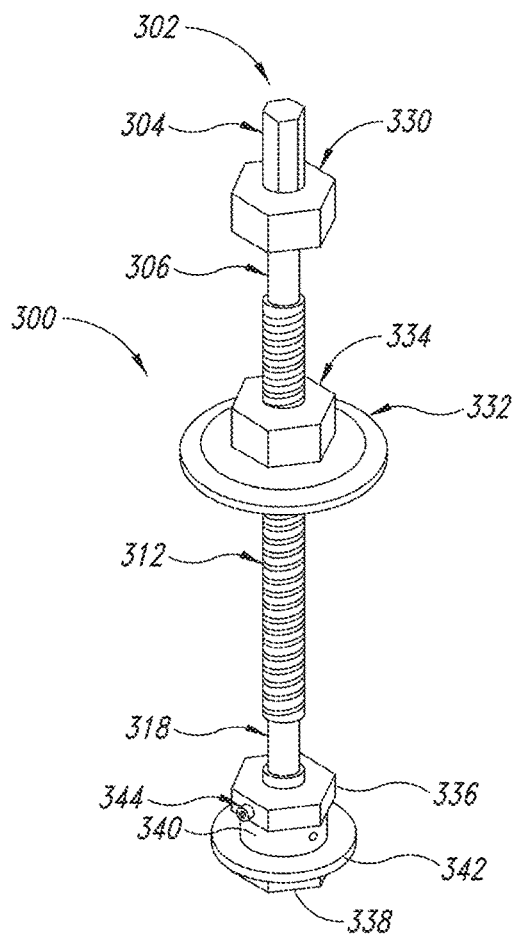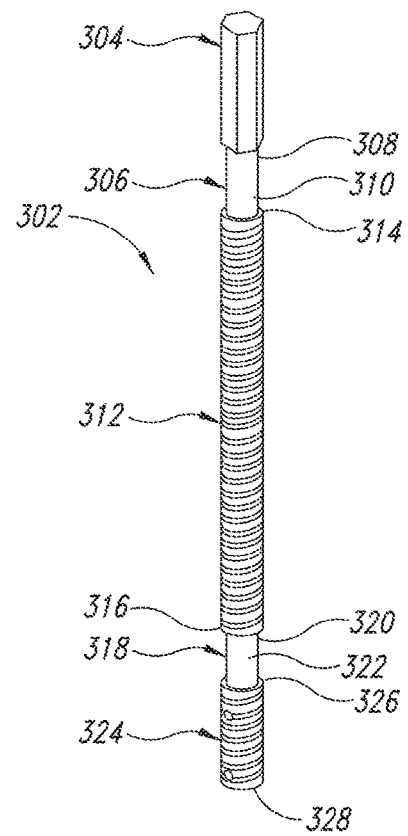
FIG. 7
FIG. 8

METHOD FOR EXTRACTING ESSENTIAL OILS

BACKGROUND

Technical Field

The present disclosure pertains to a system for extracting essential oils from plant material and, more particularly, to a closed extraction system that utilizes a vacuum to pull a solvent through the plant material.

Description of the Related Art

Many plants include oils and other minerals that have various uses and benefits apart from the fibrous plant material itself. Essential oils, once removed from the plant material, can be used in foods, medicines, and other products. Typical methods of extracting essential oils use highly pressurized systems to force a solvent through the plant material. These systems can be expensive and are very dangerous due to the high pressures.

BRIEF SUMMARY

In accordance with the present disclosure a system and method of extracting essential oils from plant material through the use of a vacuum closed system is provided.

In accordance with one aspect of the present disclosure, the system includes a solvent source, a material container structured to contain plant material, the material container in fluid communication with the solvent source, a recovery chamber in fluid communication with the material container, and a vacuum pump in fluid communication with the recovery chamber and structured to remove air from within the recovery chamber and pull solvent from the solvent source through plant material in the material container to extract oil from the plant material and move the extracted oil into the recovery chamber.

In accordance with another aspect of the present disclosure, a system for extracting essential oils from plant materials is provided. The system generally includes a solvent chamber, a material container or chamber in the form of a column, a filter, a recovery chamber, and a vacuum pump. The solvent chamber is structured to contain a solvent, such as alcohol or alcohol-based solvent. A fluid output of the solvent chamber is connected to a fluid input of the material column. The material column is structured to contain the plant material. An output of the material column is connected to an input of the filter, and an output of the filter is connected to an input of the recovery chamber. The vacuum pump is connected to the recovery chamber to create a vacuum in the recovery chamber. Ideally, the recovery chamber is structured to capture the extracted material.

The material in the material column and the solvent in the solvent chamber are cooled; either pre-cooled or by using a cooling liquid, such as liquid nitrogen. A valve at the output of the material column is used to control the movement of fluid through the system, such that when opened, the vacuum in the recovery chamber pulls fluids (cooling fluid or solvent from the solvent chamber) through the material in the material column and into the recovery chamber.

In accordance with another aspect of the present disclosure, the solvent source is a solvent chamber having a fluid output, the material column has a fluid input and a fluid output, the fluid input of the material column in fluid communication with the fluid output of the solvent chamber, the filter has a fluid input and a fluid output, the fluid input of the filter in fluid communication with the fluid output of the material column, and the recovery chamber has a fluid input in fluid communication with the fluid output of the filter.

In accordance with a further aspect of the present disclosure, a method of extracting essential oils from plant material is provided. The method generally includes the steps of introducing plant material into a material container, introducing a cooling liquid into the material container, providing a solvent for introduction into the material container, creating a vacuum in a recovery chamber that is in fluid communication with the material container, and pulling the solvent through the plant material to extract oil from the plant material and pulling the solvent and extracted oil into the recovery chamber with the vacuum from the recovery chamber.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the following drawings, wherein:

FIG. 7 is an isometric view of a plunger for use with the system formed in accordance with the present disclosure; and FIG. 8 is an isometric view of a rod used in the plunger of FIG. 7.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures or components or both associated with filters, vacuum pumps, as well as the process of purging solvents from extracted plant oils have not been shown or described in order to avoid unnecessarily obscuring descriptions of the implementations.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one implementation" or "an implementation" means that a particular feature, structure, or characteristic described in connection with the implementation is included in at least one implementation. Thus, the appearance of the phrases "in one implementation" or "in an implementation" in various places throughout the specification are not necessarily all referring to the same implementation. Furthermore, the particular features, structures, or characteristics may be combined in any suitable manner in one or more implementations.

With reference to FIGS. 1-9, shown therein is a system 100 to extract oils, such as essential oils, from plant material and plant-based materials. As described more fully below, the system 100 generally includes a solvent source, a material container in the form of a material column structured to contain plant material, the material column in fluid communication with the solvent source, a recovery chamber in fluid communication with the material container, and a vacuum source in fluid communication with the recovery chamber and structured to remove air from within the recovery chamber and pull solvent from the solvent source through plant material in the material column to extract oil from the plant material and move the extracted oil into the recovery chamber.

Figure 1:
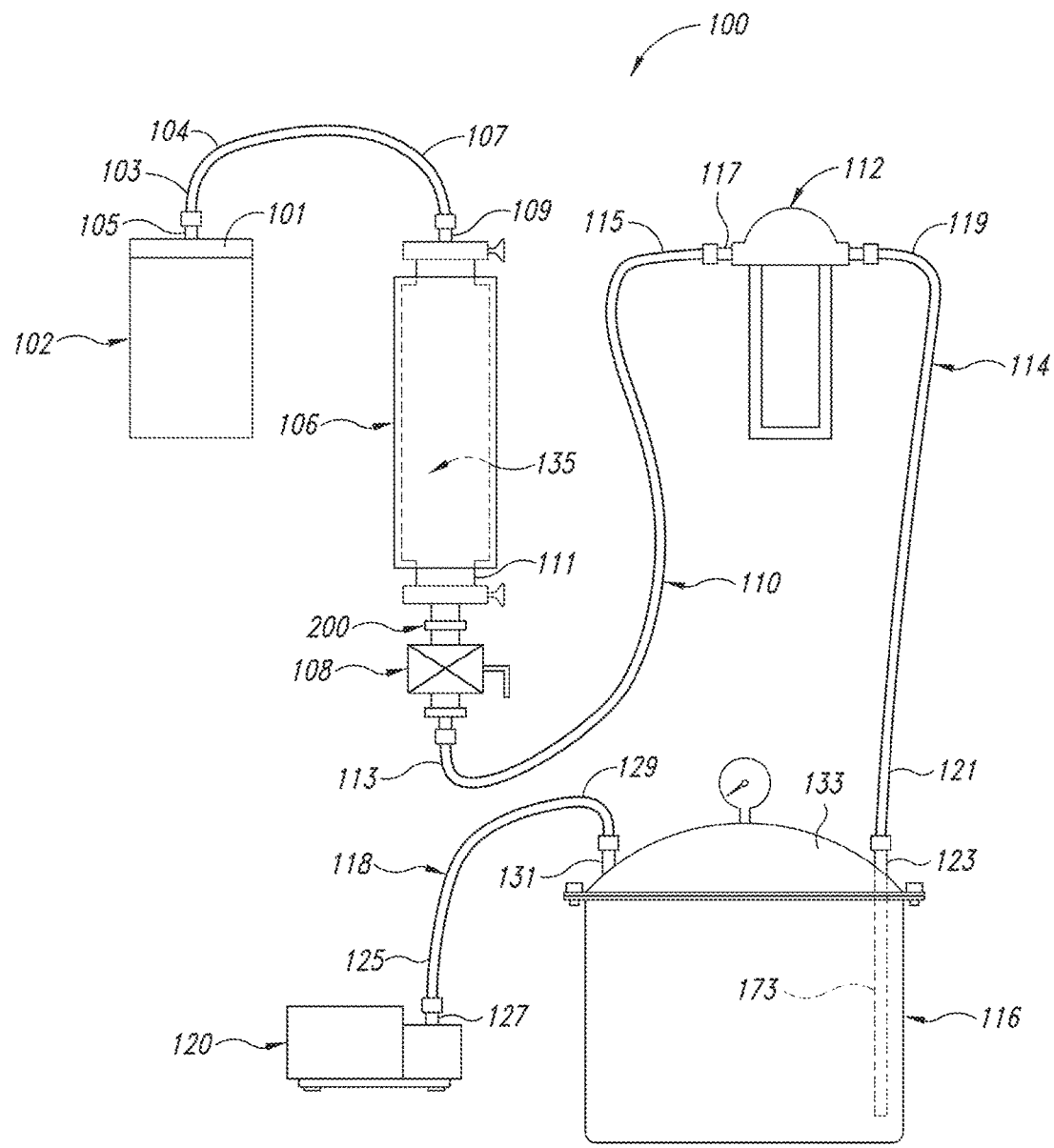
FIG. 1 is a system diagram of an implementation of an oil extraction system in accordance with one implementation of the present disclosure.

More particularly, with reference to FIG. 1, shown therein is a representative implementation of the system 100 that includes a solvent source in the form of a solvent chamber 102, a material container in the form of a material column 106 coupled to the solvent chamber 102 with a supply line 104, one or more filters 112 coupled to the column 106 with a first recovery line 110, and at least one recovery chamber 116 coupled to the filter 112 with a second recovery line 114. The system also utilizes a vacuum source in the form of a vacuum pump 120 coupled to the recovery chamber 116 via a vacuum line 118. The solvent chamber 102 preferably has a fluid output, the material container or column 106 has a fluid input and a fluid output, and the fluid input of the material column 106 is in fluid communication with the fluid output of the solvent chamber 102. The filter 112 has a fluid input and a fluid output, the fluid input of the filter 112 is in fluid communication with the fluid output of the material column 106, and the recovery chamber 116 has a fluid input in fluid communication with the fluid output of the filter 112.

In more detail, the solvent chamber 102 is connected to and in fluid communication with the material column 106 through the supply line 104. A first end 103 of the supply line 104 is connected to a fluid output 105 of the solvent chamber 102, and a second end 107 of the supply line 104 is connected to a fluid input 109 of the material column 106. In some implementations, the first end of the supply line 104 connects to a fluid port formed in a top 101 of the solvent chamber 102.

The material column 106 is connected to and in fluid communication with the filter 112 through a valve 108 via the first recovery line 110. A second end or output 111 of the material column 106, which is opposite of the first end 103 of the material column 106, is connected to the valve 108. A first end 113 of the first recovery line 110 is connected to a side of the valve 108 opposite of the side that is connected to the second end 111 of the material column 106 such that when the valve 108 is opened, a fluid (i.e., solvent and extracted material) can flow from the material column 106 to the first recovery line 110. A second end 115 of the first recovery line 110 is connected to a fluid input 117 of the filter 112.

The filter 112 is connected to and in fluid communication with the recovery chamber through the second recovery line 114. A first end 119 of the second recovery line 114 is connected to a fluid output of the filter 112, and a second end 121 of the second recovery line 114 is connected to a fluid input 123 of the recovery chamber 116.

The recovery chamber 116 is also connected to and in fluid communication with the vacuum pump 120 via the vacuum line 118. Although not shown, the vacuum pump 120 can include a vapor filter. A first end 125 of the vacuum line 118 connects to a fluid input port 127 of the vacuum pump 120 and a second end 129 of the vacuum line 118 connects to a fluid output port 131 of the recovery chamber 116. In some implementations, the input and output ports 123, 131 of the recovery chamber 116 are configured and structured to be in a top 133 of the recovery chamber 116.

A ball float or ball check valve (not shown) can be used in controlling the level of fluid in the recovery chamber 116 and prevent it from entering the vacuum pump. As the fluid rises in the chamber, the ball rises inside the housing and blocks the vacuum, thereby preventing any further fluid from being drawn into the recovery chamber 116. A housing for the ball float has holes in a top thereof to allow the vacuum to pull through the system while holes in a bottom of the housing allow fluid in the recovery chamber 116 to raise the ball and ultimately plug the vacuum port when the recovery chamber 116 is full.

To understand the basic operation of the system 100 before going into greater detail on the components, the steps for using this system 100 and the resulting process will now be described. Generally, the above-described system 100 is designed to implement a method of extracting essential oils from plant material. The method generally includes the steps of introducing plant material into the material column 106, introducing a cooling liquid into the material column 106, providing a solvent for introduction into the material column 106, creating a vacuum in the recovery chamber 116 that is in fluid communication with the material column 106, and pulling the solvent through the plant material to extract oil from the plant material and pulling the solvent and extracted oil into the recovery chamber 116 with the vacuum from the recovery chamber 116. Preferably, the plant material in the material container is cooled, either by pre-cooling in a deep freezer or other similar cooling system, or cooled within the system such as with liquid nitrogen, prior to pulling the solvent through the plant material. Additionally or in the alternative, the solvent can be cooled prior to being pulled through the plant material. This cooling of the solvent can be done by deep freezing the solvent or using a cooling liquid, such as liquid nitrogen that is introduced into the solvent container. A jacketed material container, such as a column, can be used with a cooling agent in the jacket to cool material in the container. Ethanol alcohol is recommended as a solvent because it is considered safe for human consumption; however, any solvent that remains liquid under normal atmospheric pressure and temperature may be appropriate. Isopropyl, hexane and naphtha are also commonly used solvents.

Figure 2:
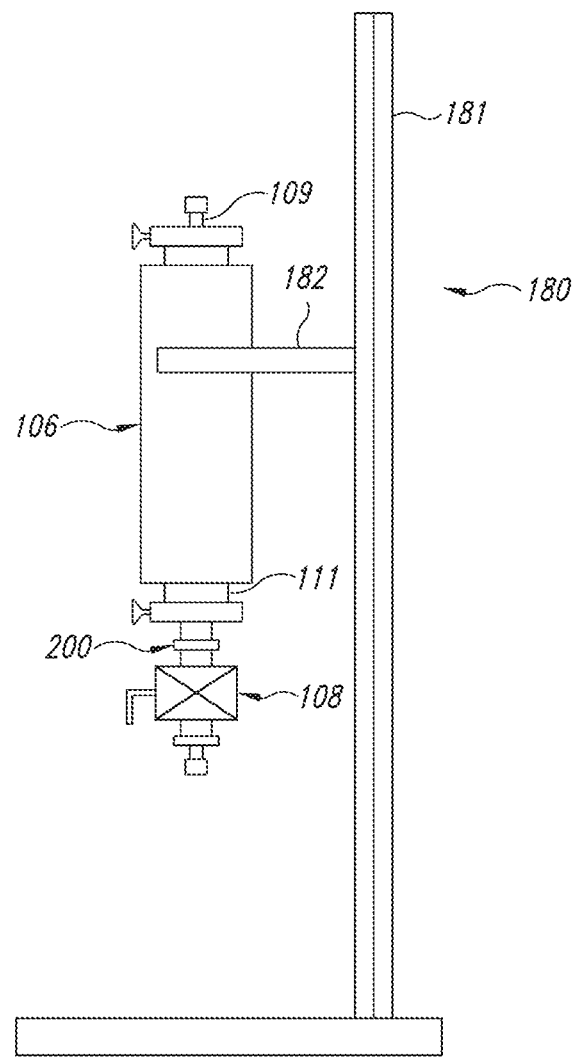
FIG. 2 is a side elevational view of a material column stand in accordance with the present disclosure.

As an initial step, the material column 106 is positioned to accept plant material into an interior 135. In some implementations, the material column 106 may be placed into a stand 180, such as illustrated in FIG. 2. In various implementations, the material column 106 is structured such that the first end 103 of the material column 106 (in which an input port is connected to the supply line 104) is configured as a top of the material column 106, and the second end 111 of the material column 106 (in which an output port is connected to the valve 108) is configured as a bottom of the material column 106. The material column 106 may be initially placed in the stand 180 without a cap at the top 101 of the material column 106 to allow for material and cooling liquid to be added to the material column 106.

FIG. 2 is a side elevational view of a material column stand 180 formed in accordance with the present disclosure. In this illustration, the material column 106 is connected to an upright post 181 on the stand 180 by a bracket 182. This mounting configuration maintains an orientation of the material column 106, such that the top 101 of the material column 106 (and the supply line) are positioned above the bottom 111 of the material column 106 (and the valve 108 and first recovery line 110). The bracket 182 may be movably mounted in the stand 180 to enable selective raising and lowering of the material column 106 by a user.

A filter pad 200 is placed between the valve 108 and the second end of the material column 106. In some implementations, the filter pad 200 may be positioned inside and at the bottom of the material column 106. In other implementations, the filter pad 200 may be positioned outside of the material column 106 but between the second end 111 of the material column 106 and the valve 108. In some implementations, a valve assembly may include the filter pad 200 and the valve 108. In at least one implementation, the filter pad 200 is a stainless steel filter pad. The filter pad 200 is readily commercially available and is well known to those skilled in the art and will, therefore, not be described in detail herein. It should be recognized that other filters may be used that restrict material from exiting the material column 106 and entering the first recovery line 110 while allowing fluid (e.g., solvent and essential oils removed from the material) to flow from the material column 106 to the first recovery line 110. Once the filter pad 200 is in position, the valve 108 is connected to the second end 111 of the material column 106.

Figure 4:
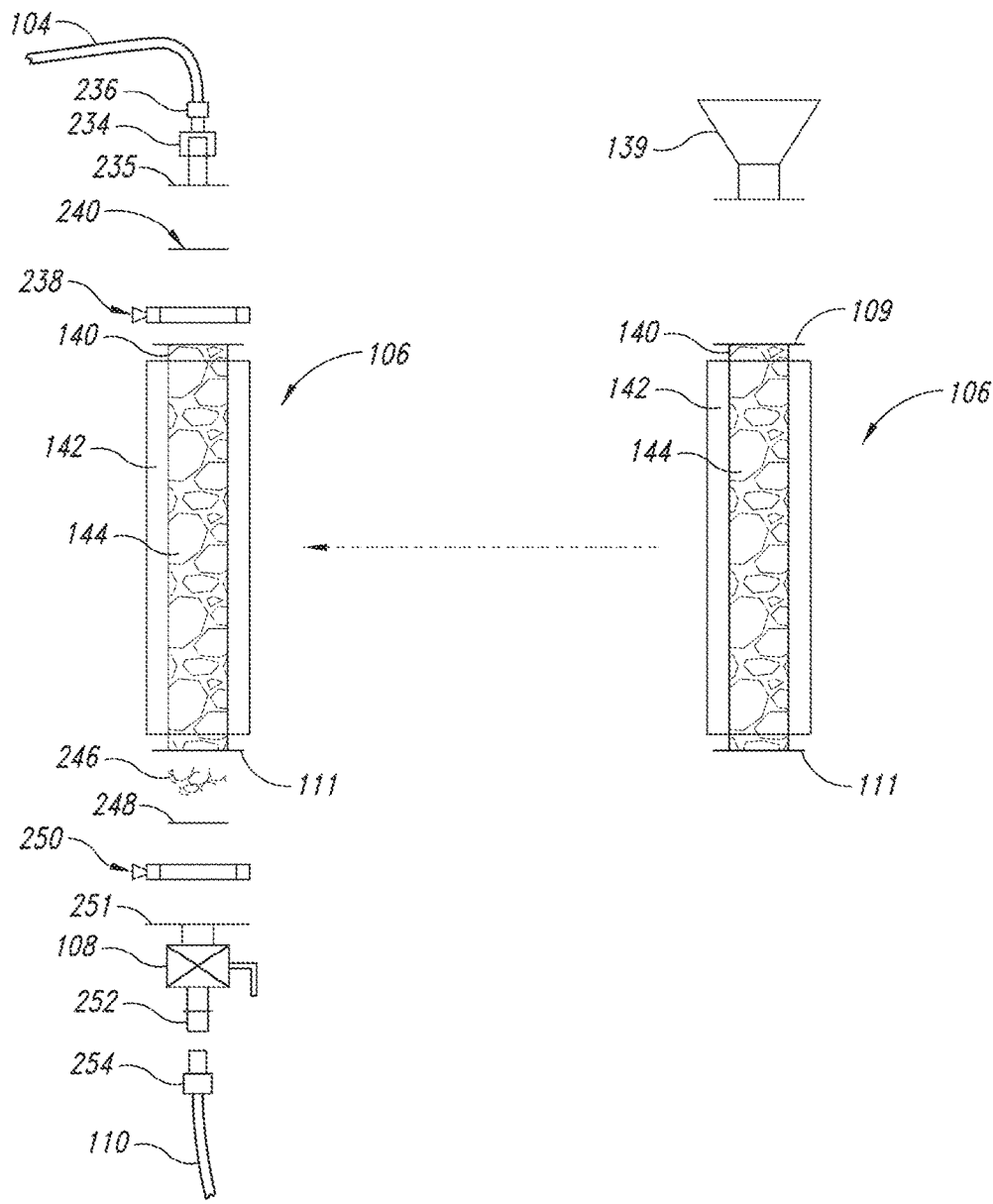
FIG. 4 is a cross-sectional view of a material column in accordance with the present disclosure.

A filling cone 139, such as shown in FIG. 4, is connected to the top of the material column 106. Material is then added to the material column 106. It should be recognized that in some implementations, material may be added to the material column 106 without a filling cone 139. A packing rod may be used to push the material from the top of the interior 135 of the material column 106 to the bottom of the interior 135 of the material column 106 near the valve 108. The material should be loosely packed in the material column 106.

The first recovery line 110 is connected between the valve 108 and the filter 112, and the second recovery line 114 is connected between the filter 112 and the recovery chamber 116. The vacuum line 118 is connected between the vacuum pump 120 and the recovery chamber 116.

With the valve 108 closed, the vacuum pump 120 is turned on to create a vacuum in the recovery chamber 116. As used herein, the term vacuum refers to a negative air pressure measured in Hg in the corresponding space with substantially all air removed. It should be recognized that a perfect vacuum in the recovery chamber 116 may not be possible nor is it required to practice implementations described herein.

Cooling liquid is poured into the material column 106 through the filling cone 139 at the top of the material column 106. The amount of cooling liquid may vary depending on the size of the material column 106 and desired temperature. In one implementation, the initial amount of cooling liquid poured into the material column 106 is one liter. Some of the cooling liquid may seep into the material in the material column 106 and some may rest on top of the material. The valve 108 can then be opened so that the vacuum in the recovery chamber 116 pulls the cooling liquid into the material. The valve 108 may be closed once the cooling liquid is no longer resting on the top of the material, i.e., the cooling liquid has been completely pulled into the material column. Additional cooling liquid can be added to the material through the filing cone 139 at the top of the material column 106, and the valve 108 opened to pull the additional cooling liquid into the material.

These steps can be repeated until the material is sufficiently cool. In one implementation, these steps are repeated a total of three times such that three liters of the cooling liquid, one liter per iteration, are added to the material column 106. In some implementations, after the cooling liquid has been added to the material, the valve 108 can be opened until the first recovery line 110 at the bottom or second end 111 of the material column 106 begins to frost. This frosting typically indicates that the material in the material column 106 is of sufficiently cold temperature.

It should be noted that other mechanisms, such as thermometers, may also be used to check the temperature of the material. The temperature range can be from and including −10 degrees Fahrenheit to −20 degrees Fahrenheit. The valve 108 is then closed once the material in the material column 106 is of sufficiently cold temperature. In some implementations, the vacuum pump 120 may continuously run during this process to ensure that the vacuum within the recovery chamber 116 is maintained to pull the cooling liquid into the material. In some implementations, a cooling liquid line (not shown) may be connected to the material column 106 to supply the cooling liquid to cool the material.

If the filling cone 139 was used to fill the material column 106 with material, the filling cone is removed from the material column 106. The second end 107 of the supply line 104 is connected to the input port at the first end 103 of the material column.

The solvent chamber 102 is filled with a proper amount of solvent. The level of solvent depends on the quantity of material in the material column 106. In at least one implementation, the solvent is alcohol. In some implementations, the solvent chamber 102 may be about 19 liters. Cooling liquid, such as liquid nitrogen, is added to the solvent in the solvent chamber 102 until the solvent reaches a desired temperature, such as approximately −57 degrees Celsius. This mixture may be occasionally stirred as the cooling liquid is added to the solvent. In some implementations, pre-cooling the solvent may help speed up this cooling process. For example, alcohol may be kept in a freezer prior to adding it to the solvent chamber 102. Once the solvent has been placed in the solvent chamber 102, the first end 103 of the supply line 104 is connected to the fluid output or output port 105 of the solvent chamber 102.

It should be recognized that sealed connections at each connection point of the solvent chamber 102, the supply line 104, the material column 106, the valve 108, the first recovery line 110, the filter 112, the second recovery line 114, the recovery chamber 116, the vacuum line 118, and the vacuum pump 120 may help the efficiency of the system in extracting essential oils from the material in the material column 106 and collecting them in the recovery chamber 116. Likewise, the filter 112 may improve the quality of the extracted material deposited in the recovery chamber. However, in some implementations, the filter 112 may not be used between the material column and the recovery chamber, but rather post-process filtering of the extracted material may be used to remove any unwanted leftover material in the extracted material.

In some situations, additional cooling liquid may be added to the solvent chamber 102 to keep the solvent at the desired temperature. In at least one implementation, a coolant chamber, coolant supply line, and valve (not illustrated)

may be connected to and in fluid communication with the solvent chamber 102 so that coolant can be added to the solvent chamber 102 without disconnecting the supply line 104 from the solvent chamber 102. Even in this implementation, the valve 108 should be closed prior to adding additional cooling liquid to the solvent chamber 102.

Once the solvent chamber 102 is empty and the extracted oils are drained from the filter 112 into the recovery chamber 116, the valve 108 can be closed and the vacuum pump 120 turned off. At this point, the supply line 104, the first recovery line 110, and the second recovery line 114 can be removed.

The resulting material in the recovery chamber is ready for purging.

Used material in the material column 106 can be removed from the chamber. In one implementation, the valve 108 and valve assembly can be removed from the material column 106, and a push rod (described in more detail herein below) can be inserted through the top of the material column 106 to push the material out the bottom of the material column 106.

In some implementations, the material column 106 and all connections between the solvent chamber 102, the supply line 104, the material column 106, the valve 108, the first recovery line 110, the filter 112, the second recovery line 114, and the recovery chamber 116 may be cleaned, such as with cleaning brushes. Such cleaning may also include cleaning all gaskets at each connection.

Figure 3:
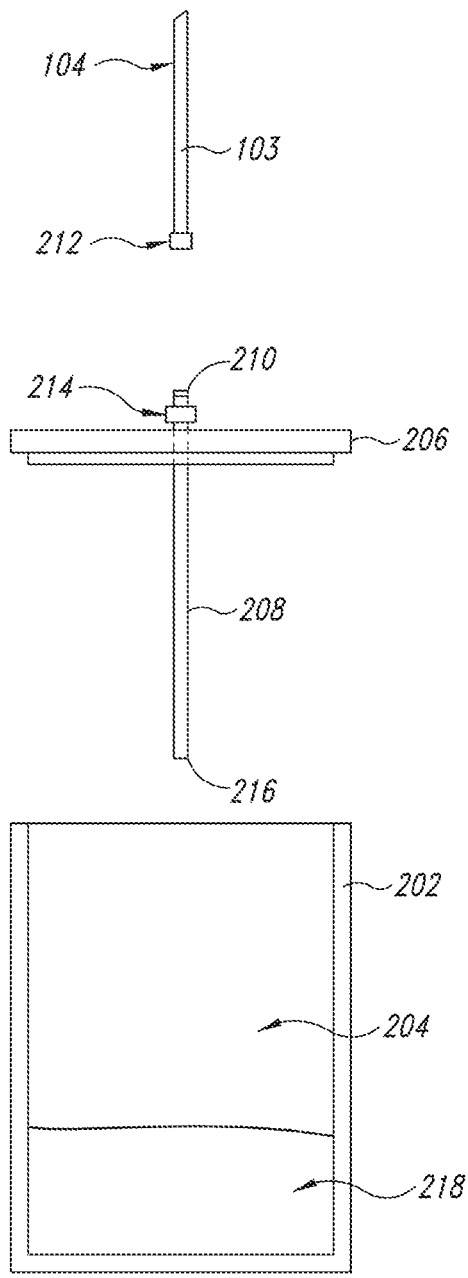
FIG. 3 is a cross-sectional view of a solvent chamber in accordance with the present disclosure.

FIG. 3 is a cross-sectional view of the solvent chamber 102 formed in accordance with the present disclosure. The solvent chamber 102 includes a solvent receptacle 202 having an interior 204 and a lid 206. In some implementations, the lid 206 and the solvent receptacle 202 may be insulated to help maintain the cooled temperature of the solvent.

The solvent receptacle 202 includes the interior reservoir 204 structured to hold solvent, cooling liquid, or both. The lid 206 is configured such that a solvent line 208 passes through an aperture in the lid 206 such that a seal is created between an exterior of the solvent line 208 and the lid 206. In some implementations, a longitudinal axis of the solvent line 208 may be transverse to a planar axis of the lid 206. The first end 103 of the supply line 104 connects to a first end 210 of the solvent line 208 via couplers 212 and 214. A second end 216 of the solvent line 208 terminates in the reservoir 204 to allow solvent 218 in the solvent receptacle or chamber 202 to enter the solvent line 208 and flow to the supply line 104.

The lid 206 and the solvent receptacle 202 are configured to be removably connected to one another. In this way, the lid 206 can be removed from the solvent receptacle 202 so that solvent, cooling liquid, or both can be added to the solvent receptacle 202. Once solvent 218 is added, the lid 206 can be connected to the solvent receptacle 202. In various implementations, the interior 204 of the solvent chamber 102 is at or near normal atmospheric pressure. In this way, the pressure in the solvent chamber 102 is higher than the vacuum in the recovery chamber 116, which allows for the movement of solvent from the higher pressure solvent chamber 102 through the material in the material column 106 and to the recovery chamber 116.

FIG. 4 is a cross-sectional view of the material column 106 formed in accordance with the present disclosure. As described elsewhere, a filling cone 139 may be attached to the top of the material column 106 to assist a user in adding material 144 into a material receptacle 140 in the interior 135 of the material column 106. Once the material 144 has been added to the material column 106, the filling cone 139 is removed from the material column 106 and the material column 106 is connected to the remainder of the system as described above. In some implementations, the material receptacle 140 may be surrounded by insulation 142 to help maintain the cooled temperature of the material.

A top cap 235 is connected to the material receptacle 140 by a clamp 238. In some implementations, a gasket 240 may be positioned between the top cap 235 and a top of the material receptacle 140 to help seal the material column 106. The top cap 235 of the material column 106 includes a coupler 234, which connects to a coupler 236 at the second end 107 of the supply line 104.

A bottom cap 251 is connected to the material receptacle 140 by a clamp 250. In various implementations, a gasket 248 may be positioned between the bottom cap 251 and a bottom of the material receptacle 140 to help seal the material column 106. In some implementations a filter pad 246 is positioned within the material receptacle 140 at the bottom of the material receptacle 140. In other implementations, the filter pad 246 is positioned outside the material receptacle 140 and between the bottom of the material receptacle 140 and the bottom cap 251. The bottom cap 251 of the material column 106 connects to the valve 108. The valve 108 connects to the first end of the first recovery line 110 via couplers 252 and 254. In some implementations the bottom cap 251, the valve 108, and the coupler 252 may be part of a valve assembly, which, in some implementations, may also include the filter pad 246.

Figure 5:
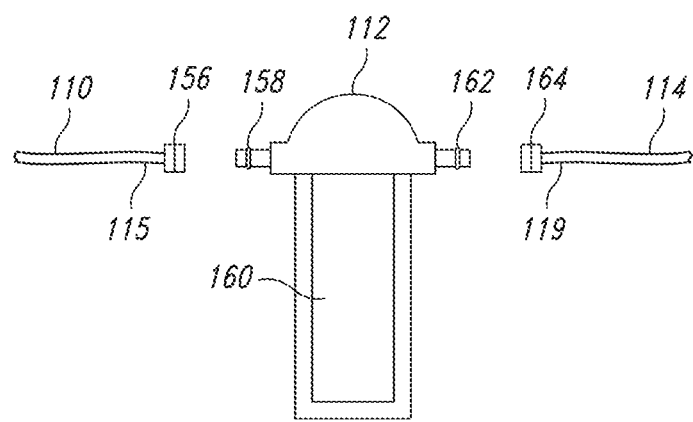
FIG. 5 is a cross-sectional view of a filter in accordance with the present disclosure.

FIG. 5 is a cross-sectional view of the filter 112, formed in accordance with the present disclosure. Filter 112 includes filter material 160 and couplers 158 and 162. In some implementations, the filter material 160 may be a charcoal filter. The second end 115 of the first recovery line 110 connects to the filter 112 via two couplers 156 and 158. The first end 119 of the second recovery line 114 connects to the filter 112 via the two couplers 162 and 164. It should be recognized that other types or configurations of the filter 112 may be used. In addition, the filter 112 may take the form of multiple filter assemblies, or filters coupled in series.

Figure 6:
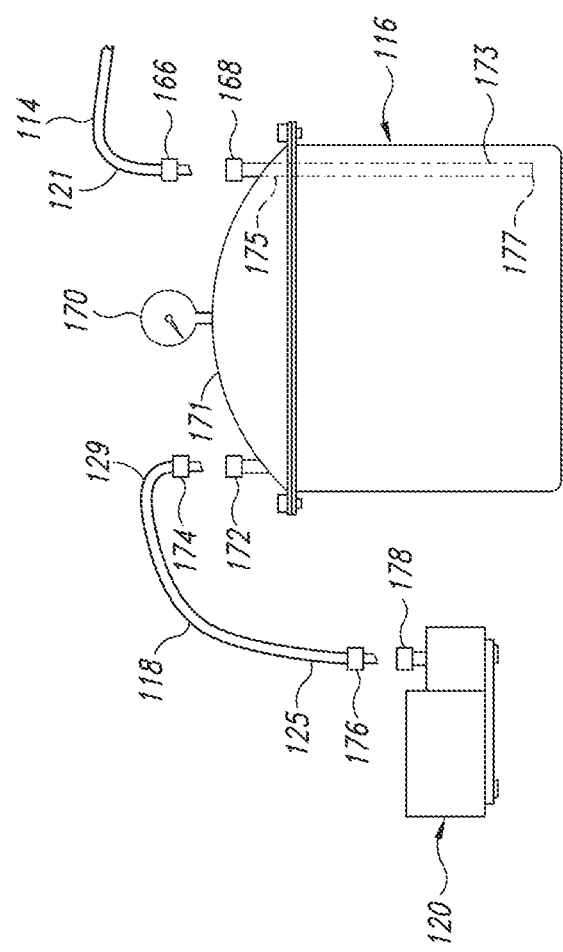
FIG. 6 is a cross-sectional view of a recovery chamber and vacuum pump in accordance with the present disclosure.

FIG. 6 is a cross-sectional view of the recovery chamber 116 and vacuum pump 120, formed in accordance with the present disclosure. The recovery chamber 116 includes a recovery lid 171 that has a vacuum gauge 170 so that a user can observe the current pressure in the recovery chamber 116. It should be recognized that the vacuum gauge 170 may be another type of pressure sensor and may be positioned inside the recovery chamber 116 or connected to the recovery chamber 116 in other configurations. The second end 121 of the second recovery line 114 connects to the recovery chamber 116 via the couplers 166 and 168. In some implementations, a first end 175 of a final recovery line 173 is attached to coupler 168 and a second end 177 of the final recovery line 173 terminates in the recovery chamber 116.

The first end 125 of the vacuum line 118 connects to the vacuum pump 120 via two couplers 176 and 178, and the second end 129 of the vacuum line 118 connects to the recovery chamber 116 via two couplers 172 and 174. In this way, the vacuum pump 120 pulls air out of the recovery chamber 116 via the vacuum line 118. Solvent 218 is then pulled from the solvent chamber 102 through the material and into the recovery chamber 116 via the second recovery line 114 and the final recovery line 173. The recovered material then settles on a bottom of the recovery chamber 116.

Although the couplers illustrated in FIGS. 1-6 are male/female connections and arranged in specific configurations, implementations are not so limited and other arrangements or types of couplers may be used so long as they are configured to properly mate together and provide a sealed connection.

FIGS. 7-8 illustrate a plunger 300 and corresponding rod 302 for use in using the system 100 described above. The plunger 300 is used as an aid in filling the material column 106 as well as in cleaning the column 106. When the column 106 is initially filled, it is at times useful to compress the material 144 before processing begins. When the process is complete, the plunger 300 is used to press spent material from the column 106.

In the representative implementation shown in FIGS. 7 and 8, the plunger 300 includes a rod 302, preferably an ACME threaded rod, having an unthreaded top 304 with a hexagonal cross-sectional configuration that extends from a first end 308 of a first smooth shaft section 306. A threaded central section 312 has a first end 314 that extends from an opposing second end 310 of the first smooth shaft section 306 and a second end 316. Extending from the second end 316 is a second smooth shaft section 318 that has its first end 320 extending from the second end 316 of the threaded central section 312 and a second end 322 that intersects with a first end 326 of a terminal threaded section 324 that has a terminal second end 328.

Ideally an outside diameter of the first and second smooth shaft sections 306, 318 is less than an outside diameter of the threaded central section 312 and the terminal threaded section 324. The threaded sections 312, 324 of the rod 302 are designed to thread faster than normal threads and is used generally when longer distance travel is needed with fewer turns required. In one implementation, an Acme thread at a 29 degree angle is suitable.

The hex-shaped section 304 at the top of the rod 302 has the hex shape milled into the rod. It is intended for use with a drill to speed the travel of the plunger 300 in the cleaning process. A hexagonal nut 330 is threaded onto the rod 302 and welded in position below the hex. It is sized and shaped for use with a wrench when it is desirable to just compress the material 144 in the material column 106 and not eject it.

A spool cap 332 having an Acme hexagonal nut 334 welded thereto is sized and shaped to be clamped to a spool of the material column in a fixed position, and the plunger 300 travels or rotates through the cap 332 to compress material or to clean material from the material receptacle 140 or "spool." A "spool" is a manufacturing term for the receptacle, in this case the material column, and manufacturing companies manufacture them in standard sizes. As shown in FIG. 7, the cap 332 is a standard spool cap that is welded to the nut 334. The cap 332 is clamped to the material column or spool with a tri-clamp to hold it in place for cleaning, "plunging," or pressing.

The first and second smooth shaft sections 306, 318 of the rod 302 that have the threads removed are sized and shaped to allow the plunger 300 to spin freely at the top and bottom of the column 106 to prevent the plunger 300 from impacting the top or bottom of the interior of the material column 106. This prevents injury to the operator as well.

Located on the terminal threaded section 324 are first and second hexagonal nuts 336, 338, respectively, with a thrust bearing 340 adjacent the first nut 336 and a washer 342 between the thrust bearing 340 and the second nut 338.

The thrust bearing 340 is in the position adjacent and below the locked first nut 336 to allow the washer 342 to turn freely when under the pressure of forcing material to compress or when ejecting material from the spool (material receptacle 140). The Acme threaded nuts 336, 338 with the holes drilled in them are used for locking the thrust bearing 340 and the plunger washer 342 in their position without tightening or loosening. A roll pin 344 is driven through openings in both nuts to bear against the terminal threaded section 324 and hold the assembly in place on the rod 302. The roll pin 344 is sized and shaped to be driven out of the nuts 336, 338 if the need arises to disassemble the plunger 300.

In use, the plunger is used as an aid in filling the material column as well as cleaning the column.

When the column is initially filled, it is at times useful to compress the product before processing begins. The plunger is then attached to the top of the filled column 106 and turned down with a wrench applied to the nut 330 welded to the rod 302 close to the top in order to compress the material 144 in the column 106 for a higher density and more solid pack for the processing. The plunger 300 is removed, and the process is continued.

When the processing is complete, the plunger 300 is re-attached to the top of the material column 106 and a drill motor is attached to the hexagonal top 304 of the plunger shaft and used to press the spent material from the column 106.

It will be readily appreciated from the foregoing that the plunger assembly 300 eliminates the need to compress the material in the column 106 with a rod and hammer and prevents possible damage to the finished surface on the interior of the column 106. The plunger assembly 300 is also used to force the spent material out of the bottom of the column 106, eliminating possible damage to the column 106 and reducing the cleaning time by a substantial amount.

What follows next are a series of questions and responses regarding optimal usage of the system 100 and the process.

Q. What is the recommended temperature for maximum yield and quality?

A. Yield results and third party potency tests show that the ideal temperature is in the range of −10 to −20 degrees. Warmer temperatures result in extraction of unwanted plant material that will be filtered out but greatly reduces filter life. Temperatures below −40 degrees Fahrenheit have shown as much as a 75% drop in yield with zero effect on potency.

Q. How much nitrogen should I use to cool unfrozen material?

A. It is recommended to start with approximately 1 cup per pound of material for unfrozen material. Once nitrogen vapor is no longer visible, check for desired temperature.

Q. How long does the extraction process take?

A. It depends on the quantity of material you will be running. Once the system is set up, it takes approximately 2 to 3 minutes per gallon of alcohol.

Q. How much alcohol is required?

A. Generally 1 gallon per ½ pound of material is sufficient. Different plant material may require more or less, and we recommend using enough alcohol that it appears clear in the first filter upon completion.

Q. How much alcohol will be lost during the process?

A. After the alcohol becomes clear as seen through the filter container, it is recommended to remove the suction tube and allow the machine to continue running until there is nothing dripping into the first filter. This may take up to 60 minutes. Generally the material will retain approximately ½ cup per pound of material. Empty the material column and allow remaining alcohol to drain into a container for further use.

Q. How much oil will a run typically yield?
A. The yield greatly depends on the type and quality of material that will be running. On average one should expect between 3 and 4 grams per oz. of good dry material.

Q. Should the material be wet or dry?
A. Test results show dry material provides up to 50% more yield. Drying the starting plant material as much as possible allows the plant compounds to release more easily and also saves on filter life. If it is desired to store dry material, it is recommended to keep it sealed and frozen to retain freshness Q. How tight should I pack the material column?
A. Gentle packing is recommended, which means press your material down and gently pack but do not use extreme force. The material must become fully saturated, ensuring full extraction, but once saturated, the flow through the material guarantees maximum yield. If material is packed too tightly, flow is restricted, resulting in the possibility of material retaining some desired compounds. If material is too loosely packed, material may not reach full saturation, leaving behind desired compounds.

Q. What color should the oil be?
A. There are many different plant types that contain many different compounds and quantities of each. Different compounds pose different colors. There is no "normal" color or consistency for an oil. Essential oils come in many different forms. Many oil processors try to use selective processing to achieve golden or clear color, stating that they are eliminating unwanted elements. The operator must ask what part of these plants they are eliminating as unwanted and what parts they are trying to process.

The various implementations described above can be combined to provide further implementations. For example, it is to be understood that the washer 342 and the stainless steel tri-clamp cap 332, as well as the overall length of the Acme rod 302, will vary to fit the intended column 106 size.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A non-pressurized, vacuum-only method of extracting oil from plant material, comprising:
   cooling plant material in a material container;
   extracting oil from the plant material, the extracting including:
      generating a continuous vacuum in a recovery chamber that is in fluid communication with the material container, the generating the continuous vacuum including using a vacuum pump connected to the recovery chamber only;
      continuously pulling solvent through the plant material in the material container by using only the continuous vacuum in the recovery chamber to extract oil from the plant material and generate a liquid containing extracted oil from the plant material and solvent;
      continuously pulling the liquid containing solvent and extracted oil into the recovery chamber with the continuous vacuum from the recovery chamber and leaving the plant material in the material container; and
      purging solvent from the liquid in the recovery chamber.

2. The method of claim 1, further comprising introducing cooling liquid into the material container prior to the continuously pulling solvent through the plant material.

3. The method of claim 2, further comprising cooling the solvent with cooling liquid before the introducing the solvent into the material container.

4. The method claim 3, wherein the cooling liquid is liquid nitrogen.

5. A non-pressurized vacuum-only method of extracting oil from plant material, comprising:
   introducing plant material into a material container;
   generating a continuous vacuum in a recovery chamber that is in fluid communication with the material container by using a vacuum pump connected to the recovery chamber only;
   continuously pulling solvent through the plant material in the material container by using only the continuous vacuum in the recovery chamber to extract oil from the plant material and generate a liquid containing extracted oil and solvent;
   continuously pulling the liquid containing solvent and extracted oil into the recovery chamber with only the continuous vacuum from the recovery chamber and leaving the plant material in the material container; and
   purging solvent from the liquid in the recovery chamber.

6. The method of claim 5, further comprising an initial step of cooling the plant material prior to the introducing the plant material into the material container.

7. The method of claim 5, further comprising cooling the plant material while the plant material is in the material container prior to the continuously pulling solvent through the plant material.

8. The method of claim 5, further comprising, after the introducing the plant material into the material container and prior to the generating of the continuous vacuum, introducing cooling liquid into the material container to cool the plant material.

9. The method claim 8, wherein the cooling liquid is liquid nitrogen.

10. The method of claim 5, further comprising cooling solvent in a solvent chamber prior to the continuously pulling solvent through the plant material in the material container.

11. A non-pressurized vacuum-only process of extracting oil from plant-based material using an extraction system that includes a solvent chamber in fluid communication with a material column that in turn is in fluid communication with a recovery chamber via a filter, and a vacuum pump that is connected only to the recovery chamber, the process comprising:
   introducing plant-based material into the material column;
   introducing solvent into the material column;
   generating a continuous vacuum in the recovery chamber with the vacuum pump that is connected only to the recovery chamber to continuously pull solvent through the plant-based material and continuously generate liquid containing solvent and extracted oil;
   continuously pulling the liquid containing solvent and extracted oil into the recovery chamber from the material column with only the continuous vacuum from the recovery chamber and leaving plant material in the material column; and purging solvent from liquid in the recovery chamber.

12. The process of claim 11, further comprising cooling the plant-based material prior to the introducing the plant-based material into the material column.

13. The process of claim 11, further comprising cooling the plant-based material after the introducing the plant-based material into the material column and before the introducing solvent into the material column by introducing liquid nitrogen into the material column and pulling the liquid nitrogen through the plant-based material in the material column by using only the vacuum in the recovery chamber.

14. The process of claim 11, further comprising introducing solvent into the solvent chamber prior to the introducing solvent into the material column.

15. The process of claim 14, further comprising cooling solvent prior to the introducing solvent into the solvent chamber.

16. The process of claim 15, wherein the cooling solvent comprises either freezing solvent or introducing cooling liquid into solvent in the solvent chamber.

17. The process of claim 11, further comprising filtering the liquid containing extracted oil and solvent prior to the pulling the liquid containing extracted oil and solvent into the recovery chamber.

18. The process of claim 11 further comprising compressing plant-based material in the material column prior to the introducing solvent into the material column.

19. The process of claim 18 wherein the compressing plant-based material in the material column comprises using a plunger that is mechanically attached to a top of the material column.

20. The process of claim 19, further comprising, after the pulling the liquid containing extracted oil and solvent into the recovery chamber, stopping the creating of the continuous vacuum, opening the material column, attaching the plunger to the material column, and pressing spent material out of the material column for purposes of cleaning the material column.

* * * * *